(12) United States Patent
Lin et al.

(10) Patent No.: US 10,075,690 B2
(45) Date of Patent: Sep. 11, 2018

(54) METHOD OF MOTION INFORMATION PREDICTION AND INHERITANCE IN MULTI-VIEW AND THREE-DIMENSIONAL VIDEO CODING

(71) Applicant: MediaTek Inc., Hsin-Chu (TW)

(72) Inventors: Jian-Liang Lin, Su'ao Township, Yilan County (TW); Yi-Wen Chen, Taichung (TW)

(73) Assignee: MEDIATEK INC., Hsin-Chu (TW)

( * ) Notice: Subject to any disclaimer, the term of this patent is extended or adjusted under 35 U.S.C. 154(b) by 50 days.

(21) Appl. No.: 14/916,462

(22) PCT Filed: Oct. 17, 2014

(86) PCT No.: PCT/CN2014/088845
§ 371 (c)(1),
(2) Date: Mar. 3, 2016

(87) PCT Pub. No.: WO2015/055143
PCT Pub. Date: Apr. 23, 2015

(65) Prior Publication Data
US 2016/0198139 A1    Jul. 7, 2016

Related U.S. Application Data

(60) Provisional application No. 61/892,251, filed on Oct. 17, 2013.

(51) Int. Cl.
*H04N 19/52* (2014.01)
*H04N 13/00* (2018.01)
(Continued)

(52) U.S. Cl.
CPC ....... *H04N 13/0048* (2013.01); *G06K 9/6201* (2013.01); *H04N 19/176* (2014.11); *H04N 19/52* (2014.11); *H04N 19/597* (2014.11)

(58) Field of Classification Search
CPC ... H04N 13/0048; H04N 19/597; H04N 19/52
See application file for complete search history.

(56) References Cited

U.S. PATENT DOCUMENTS 8,917,775 B2 * 12/2014 Park .................. H04N 19/597
375/240.24
8,948,241 B2 * 2/2015 Chen ................ H04N 21/23432
375/240
(Continued)

FOREIGN PATENT DOCUMENTS

CN     101222638     7/2008
CN     101491079     7/2009
(Continued)

OTHER PUBLICATIONS

International Search Report dated Feb. 4, 2015, issued in application No. PCT/CN2014/088845.

*Primary Examiner* — Jay Patel
*Assistant Examiner* — Irfan Habib
(74) *Attorney, Agent, or Firm* — McClure, Qualey & Rodack, LLP (57) ABSTRACT

A method for three-dimensional video coding using aligned motion parameter derivation for motion information prediction and inheritance is disclosed. Embodiments according to the present invention utilize motion parameters associated with a corresponding block for motion information prediction or inheritance. The aligned motion parameters may be derived by searching each current reference picture list of the current block to find a matched reference picture having a same POC (Picture Order Count) or a same view index as that of the reference picture pointed by the MV of the corresponding block. The aligned motion parameters may also be derived by searching each current reference picture list to check whether the reference picture index of the reference picture in the reference view to be inherited (Continued)

exceeds a maximum reference picture index of each current reference picture list of the current block.

20 Claims, 5 Drawing Sheets

(51) Int. Cl.
*H04N 19/597* (2014.01)
*H04N 19/176* (2014.01)
*G06K 9/62* (2006.01)

(56) References Cited

U.S. PATENT DOCUMENTS

| | | | | |
|---|---|---|---|---|
| 9,277,200 | B2* | 3/2016 | Chen | H04N 19/597 |
| 9,300,978 | B2* | 3/2016 | Hallapuro | H04N 19/52 |
| 9,357,199 | B2* | 5/2016 | Wang | H04N 19/597 |
| 9,380,289 | B2* | 6/2016 | Chen | H04N 19/70 |
| 9,398,284 | B2* | 7/2016 | Chen | H04N 19/597 |
| 9,473,752 | B2* | 10/2016 | Chen | H04N 13/0003 |
| 9,509,972 | B2* | 11/2016 | Yea | H04N 13/0022 |
| 9,521,389 | B2* | 12/2016 | Chen | H04N 19/597 |
| 9,560,353 | B2* | 1/2017 | Sugio | H04N 19/597 |
| 9,596,448 | B2* | 3/2017 | Thirumalai | H04N 19/597 |
| 9,615,078 | B2* | 4/2017 | Lee | H04N 19/597 |
| 9,648,342 | B2* | 5/2017 | Zhang | H04N 19/52 |
| 9,667,990 | B2* | 5/2017 | Chen | H04N 19/597 |
| 9,699,450 | B2* | 7/2017 | Zhang | H04N 19/44 |
| 9,736,454 | B2* | 8/2017 | Hannuksela | H04N 13/0048 |
| 9,800,857 | B2* | 10/2017 | Zhang | H04N 13/0048 |
| 9,900,576 | B2* | 2/2018 | Thirumalai | H04N 19/597 |
| 2006/0222252 | A1* | 10/2006 | Lee | H04N 13/0066 382/239 |
| 2008/0170618 | A1* | 7/2008 | Choi | H04N 13/0022 375/240.16 |
| 2008/0273599 | A1* | 11/2008 | Park | H04N 19/597 375/240.24 |
| 2009/0168874 | A1* | 7/2009 | Su | H04N 19/597 375/240.12 |
| 2009/0323824 | A1 | 12/2009 | Pandit et al. | |
| 2010/0098157 | A1* | 4/2010 | Yang | H04N 19/597 375/240.12 |
| 2010/0135391 | A1* | 6/2010 | Tian | H04N 19/597 375/240.12 |
| 2012/0014449 | A1* | 1/2012 | Park | H04N 9/68 375/240.16 |
| 2012/0213282 | A1 | 8/2012 | Choi et al. | |
| 2014/0078254 | A1* | 3/2014 | Lin | H04N 19/597 348/43 |
| 2014/0161191 | A1* | 6/2014 | Srinivasan | H04N 19/51 375/240.16 |

FOREIGN PATENT DOCUMENTS

| | | |
|---|---|---|
| CN | 101496407 A | 7/2009 |
| CN | 102036066 A | 4/2011 |
| KR | 20080066522 | 7/2008 |
| KR | 20120095610 | 8/2012 |
| WO | WO 2008/084997 | 7/2008 |
| WO | WO 2012/115436 | 8/2012 |

* cited by examiner

METHOD OF MOTION INFORMATION PREDICTION AND INHERITANCE IN MULTI-VIEW AND THREE-DIMENSIONAL VIDEO CODING

CROSS REFERENCE TO RELATED APPLICATIONS

The present invention claims priority to U.S. Provisional Patent Application Ser. No. 61/892,251, filed on Oct. 17, 2013, entitled "Method for Motion information prediction/inheritance in multiview and 3D video coding". The U.S. Provisional Patent Application is hereby incorporated by reference in its entirety.

FIELD OF INVENTION

The present invention relates to three-dimensional (3D) and multi-view video coding. In particular, the present invention relates to derivation of aligned motion parameter for motion information prediction and inheritance in 3D and multi-view video coding.

BACKGROUND OF THE INVENTION

Three-dimensional (3D) television has been a technology trend in recent years that intends to bring viewers sensational viewing experience. Various technologies have been developed to enable 3D viewing. Among them, the multi-view video is a key technology for 3DTV application among others. The traditional video is a two-dimensional (2D) medium that only provides viewers a single view of a scene from the perspective of the camera. However, the multi-view video is capable of offering arbitrary viewpoints of dynamic scenes and provides viewers the sensation of realism.

The multi-view video is typically created by capturing a scene using multiple cameras simultaneously, where the multiple cameras are properly located so that each camera captures the scene from one viewpoint. Accordingly, the multiple cameras will capture multiple video sequences corresponding to multiple views. In order to provide more views, more cameras have been used to generate multi-view video with a large number of video sequences associated with the views. Accordingly, the multi-view video will require a large storage space to store and/or a high bandwidth to transmit. Therefore, multi-view video coding techniques have been developed in the field to reduce the required storage space or the transmission bandwidth.

A straightforward approach may be to simply apply conventional video coding techniques to each single-view video sequence independently and disregard any correlation among different views. Such coding system would be very inefficient. In order to improve efficiency of multi-view video coding, typical multi-view video coding exploit sinterview redundancy. Therefore, most 3D Video Coding (3DVC) systems take into account of the correlation of video data associated with multiple views and depth maps. The standard development body, the Joint Video Team of the ITU-T Video Coding Experts Group (VCEG) and the ISO/IEC Moving Picture Experts Group (MPEG), extended H.264/MPEG-4 AVC to multi-view video coding (MVC) for stereo and multi-view videos.

The MVC adopts both temporal and spatial predictions to improve compression efficiency. During the development of MVC, some macro block-level coding tools are disclosed, including illumination compensation, adaptive reference filtering, motion skip mode, and view synthesis prediction. These coding tools are developed to exploit the redundancy between multiple views. The multi-view/3D coding tools that utilize inter-view motion information are briefly reviewed as follows.

3D video coding is developed for encoding/decoding video of multiple views simultaneously captured by several cameras. A multi-view video contains a large amount of inter-view redundancy, since all cameras capture the same scene from different viewpoints. In 3D-AVC (3D video coding based on Advanced Video Coding (AVC) standard), Depth-based motion vector prediction (DMVP) is a coding tool which utilizes the motion information of reference views or disparity vectors for further improving the accuracy of motion vector predictors. The DMVP tool consists of two parts, direction-separated MVP (DS-MVP) for the Inter mode and disparity-based Skip and Direct modes, which are described as follows.

Direction-Separated MVP (DS-MVP)

Conventional median-based MVP of H.264/AVC is restricted to identical prediction directions (i.e., temporal or inter-view) of motion vector candidates. All available neighboring blocks are classified according to the direction of their prediction.

Inter-View Prediction

Figure 1A:
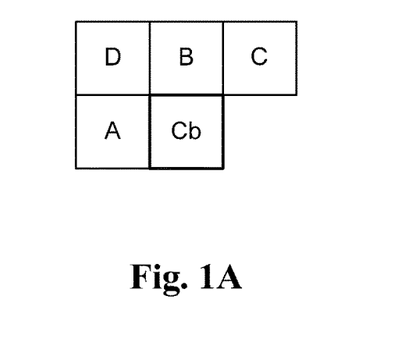
FIGS. 1A-B illustrate an example of direction-separated motion vector prediction (DS-MVP) for inter-view prediction in 3D-AVC.
Figure 1B:
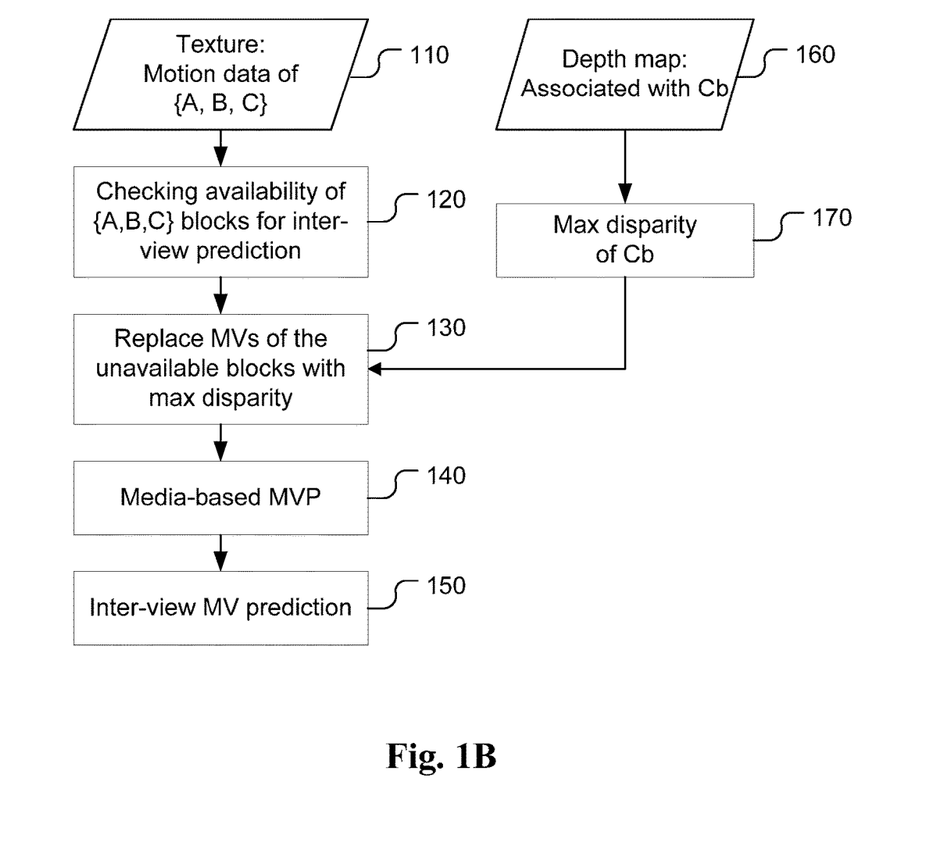

FIG. 1B illustrates an exemplary flowchart of Inter-View prediction process to derive an inter-view motion predictor. The disparity vector is derived according to 3D-AVC Test Model 7 (DmytroRusanovskyy, et al., Joint Collaborative Team on 3D Video Coding Extension Development of ITU-T SG 16 WP 3 and ISO/IEC JTC 1/SC 29/WG 11, 5th Meeting: Vienna, AT, 27 Jul.-2 Aug. 2013, document: JCT3V-E1003). As shown in FIG. 1A and FIG. 1B, if the current block Cb uses an inter-view reference picture, the neighboring blocks that do not utilize inter-view prediction are marked as unavailable for MVP. If the target reference picture is an inter-view prediction picture, the inter-view motion vectors of the adjacent blocks around the current block Cb, such as A, B, and C in FIG. 1A are employed in the derivation of the motion vector prediction. If motion information is not available from block C, block D is used instead.

As shown in FIG. 1B, when the target reference picture is an inter-view prediction picture, the inter-view motion vectors of the neighboring blocks are used to derive the inter-view motion vector predictor. In block 110 of FIG. 1B, inter-view motion vectors of the spatially neighboring blocks are used as input. The depth map associated with the current block Cb is also provided in block 160. The availability of inter-view motion vector for blocks A, B and C is checked in block 120. If an inter-view motion vector is unavailable, the disparity vector for the current block is used to replace the unavailable inter-view motion vector as shown in block 130. The disparity vector is derived from the maximum depth value of the associated depth block as shown in block 170. The median of the inter-view motion vectors of blocks A, B and C is used as the inter-view motion vector predictor as shown in block 140. Block D is used only when inter-view motion vector associated with C is unavailable. Inter-view motion vector coding based on the motion vector predictor is performed as shown in block 150.

Inter (Temporal) Prediction

If Cb uses temporal prediction, neighboring blocks that used inter-view reference pictures are marked as unavailable for MVP. Motion vectors of the neighboring blocks marked as unavailable are replaced with a motion vector of a corresponding block in a reference view. The corresponding block is derived by applying disparity vector, DV to the coordinates of the current texture block. The disparity vector is derived as specified according to 3D-AVC Test Model 7. If corresponding block is not coded with inter-prediction (i.e., no motion information available), a zero vector is considered. The flowchart of this process is depicted in FIG. 2A and FIG. 2B.

Figure 2A:
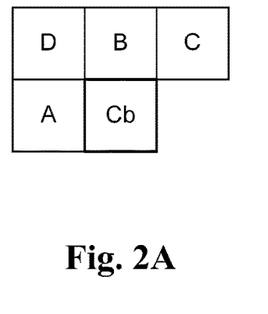
FIGS. 2A-B illustrate an example of direction-separated motion vector prediction (DS-MVP) for temporal prediction in 3D-AVC.
Figure 2B:
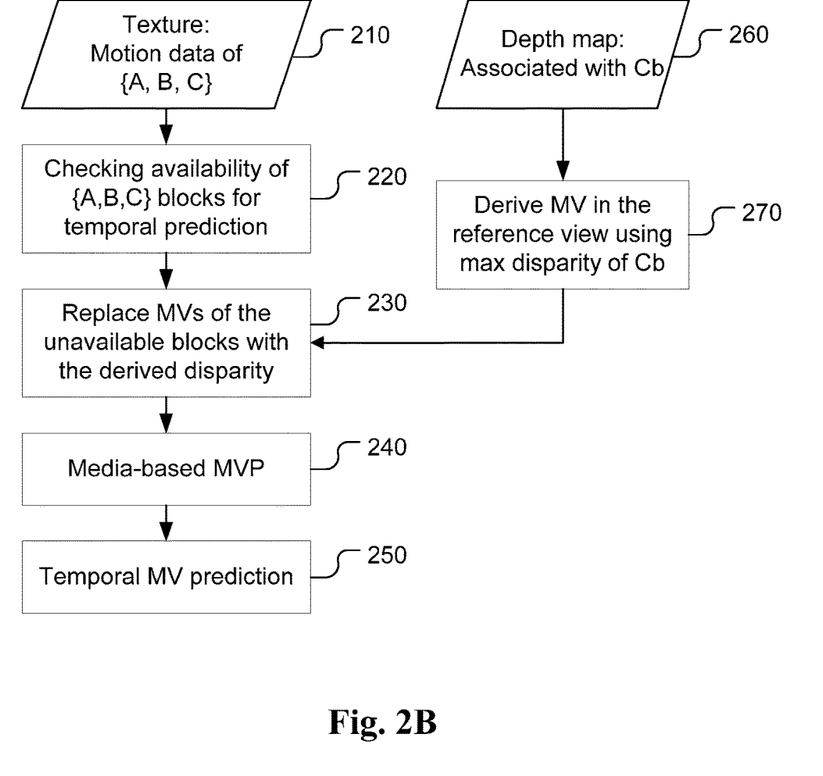

If the target reference picture is a temporal prediction picture, the temporal motion vectors of the adjacent blocks around the current block Cb, such as A, B, and C in FIG. 2A are employed in the derivation of the motion vector prediction. In block 210 of FIG. 2B, temporal motion vectors of the spatially neighboring blocks are provided as input. The depth map associated with the current block Cb is also provided in block 260. The temporal motion vector of a neighboring block is checked in step 220. If the temporal motion vector of a neighboring block is unavailable, an inter-view motion vector is used as shown in step 230. The inter-view motion vector is derived from the corresponding block located using a DV converted from maximum disparity as shown step 270. The motion vector prediction is then derived as the median of the motion vectors of the adjacent blocks A, B, and C as shown in step 240. Block D is used only when C is unavailable. The result is provided as the temporal MV predictor as shown in step 250.

Disparity-Based Skip and Direct Modes

Figure 3:
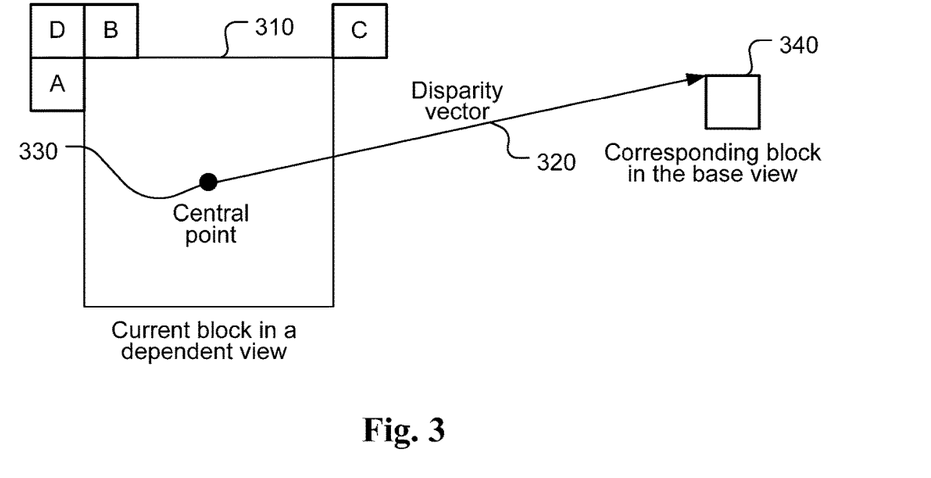
FIG. 3 illustrates an example of neighboring block configuration for determining a corresponding block in a base or reference view using a derived disparity according to 3D-AVC.

When the derived motion vector predictor provides a good prediction, the motion residue may be zero or very small so that there is no need to transmit any motion information. This case is referred as a Skip or Direct mode and no motion information needs to be coded. The motion information can be derived at the encoder and decoder sides through an identical process. Therefore, only predicted block residue needs to be coded. Furthermore, the reference block associated with the motion information may provide a good prediction for a current block so that there is no need to transmit the block residue. This case is referred as a Skip mode. For the Direct mode, no motion information needs to be coded and only block residue is coded. For inter-view prediction, motion information for coding of the current block, Cb (310) in Skip/Direct modes is derived from motion information of the corresponding block (340) in the base view. The correspondence between Cb and corresponding block in the base view is established through a disparity vector (320) that is applied at the central sample (330) of block Cb shown in FIG. 3. The corresponding block (340) referenced by this vector (320) in the base view provides motion information (reference index and motion vectors) for coding of the current Cb.

Figure 4:
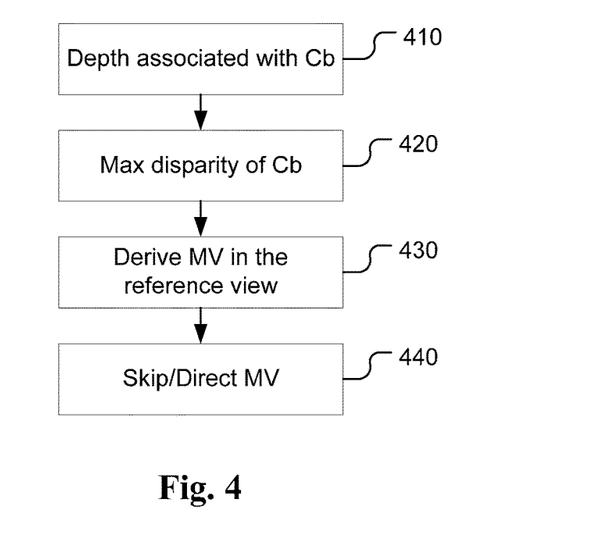
FIG. 4 illustrates a flowchart of inter-view MVP derivation for Skip/Direct mode.

The disparity derivation procedure for the Skip/Direct mode according to 3D-AVC Test Model 7 is illustrates in FIG. 4. The depth associated with a current block, Cb is received in step 410 and the maximum disparity of the depth is determined in step 420. The inter-view motion vector is then derived from the corresponding block located using a DV converted from maximum disparity as shown step 430. If the corresponding block in base view is not available, the direction-separated MVP derivation with reference index equal to zero is used. The inter-view MV is then used as Skip/Direct candidate as shown in step 440.

Figure 5:
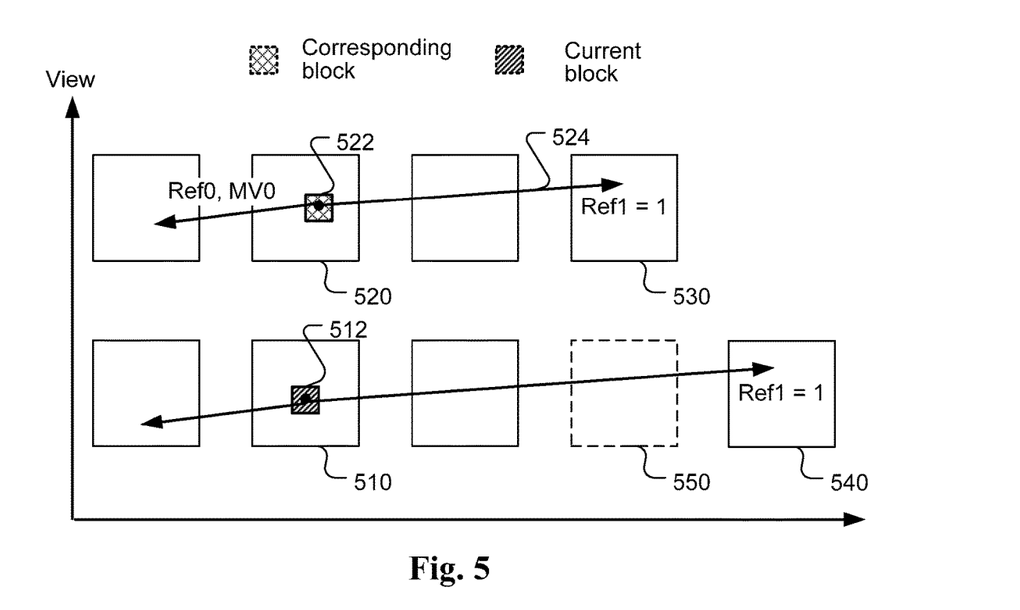
FIG. 5 illustrates an example of misalignment between the inherited motion vector from the corresponding block and the inherited reference picture index pointing to a reference picture in the reference picture list of the current block.

In the current 3D-AVC Test Model version 9.0 (ATM-9.0), motion parameters such as motion vector (MV) and reference picture index of the corresponding block in the base view or reference view are directly inherited by the current block. However, when the inherited MV is a conventional temporal MV instead of an inter-view MV and when the picture order count (POC) of the reference picture pointed by the inherited reference picture index in current view is not the same as the POC of the reference picture of the corresponding block in the base view (or reference view), it may cause misalignment between the inherited reference picture index and the inherited MV for coding current block. FIG. 5 illustrates an example of misalignment between the inherited reference picture index and the inherited MV for coding current block. In FIG. 5, current block 512 of the current picture 510 is in a dependent view and corresponding block 522 of reference picture 520 in a base view or reference view. Block 512 inherits the motion parameters 524 (motion vector and reference picture index pointing to a reference picture 530). However, the corresponding reference picture 550 as shown in a dash lined box is not in the reference picture list for the current block. The inherited reference picture index points to a reference picture 540 in list 1 for the current block, which has a different POC from the inherited reference picture (530). Likewise, when the POC of the reference picture of the reference block used to derive motion parameter does not match any reference picture in the reference picture list of the direction (list0 or list1) of the current picture, it also causes misalignment between the inherited reference picture index and the inherited MV for coding current block.

Similarly, when the inherited MV is an inter-view MV, which reuses the inherited reference picture index and MVs may cause misalignment between the inherited reference picture index and the inherited MV for coding current block. This is because the view index of the reference picture pointed by the inherited reference picture index in the current view may not be identical to the view index of the reference picture of the corresponding block in the base view (or reference view). Even when the view index of the reference picture pointed by the inherited reference picture index in current view is identical to the view index of the reference picture of the corresponding block in the base view (or reference view), reusing the inherited MVs (which is DVs) directly will also cause misalignment because the inherited MVs/DVs should be scaled according to the view distance.

Figure 6:
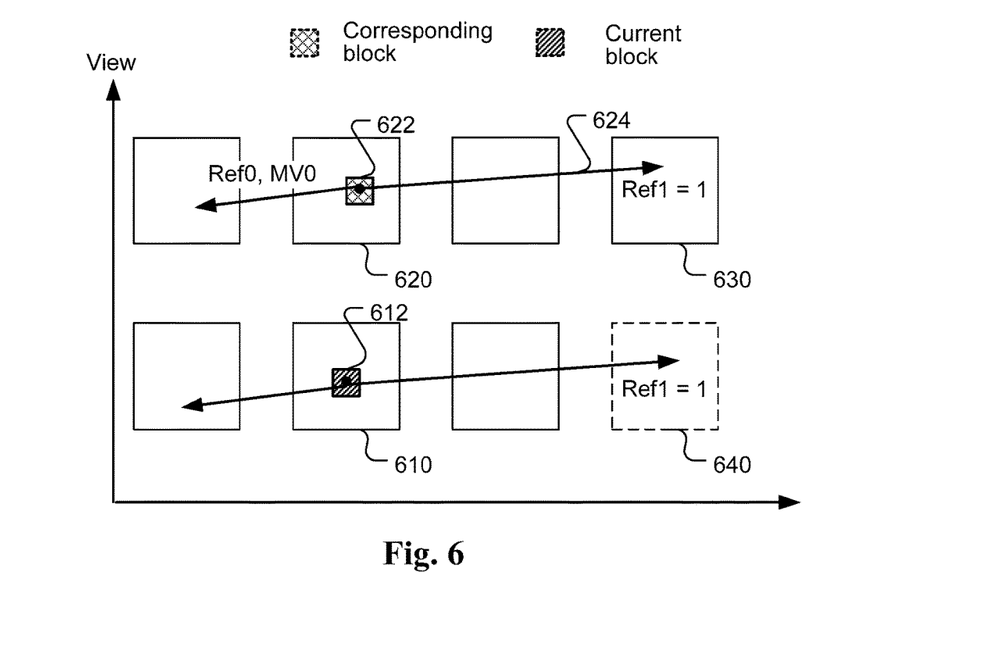
FIG. 6 illustrates another example of misalignment between the inherited motion vector from the corresponding block and the inherited reference picture index pointing to a reference picture in the reference picture list of the current block.

It becomes even worse when the inherited reference picture index is not valid for current block. FIG. 6 illustrates an example where the inherited reference picture index may exceed the maximum reference picture index of the current block. In FIG. 6, current block 612 of the current picture 610 is in a dependent view and corresponding block 622 of reference picture 620 in a base view or reference view. Block 612 inherits the motion parameter 624 including the motion vector and reference picture index equal to 1. However, the inherited reference picture index, corresponding reference picture 640 as shown in a dash lined box, is beyond the last picture in the reference picture list for the current block (In this example, the size of the reference picture list for the current block is 1, therefore, the maximum reference picture index is 0). In this case, the encoder/decoder may crash due to memory fault related to the invalid reference picture index. Therefore, it is desirable to design a system that can avoid these issues.

SUMMARY OF THE INVENTION

A method for three-dimensional video coding using aligned motion parameter derivation for motion information prediction and inheritance is disclosed. Embodiments according to the present invention utilize motion parameters associated with a corresponding block for motion information prediction or inheritance. Since the motion vector may point to a reference picture not in the reference picture list, a misalignment occurs between the inherited motion vector from the corresponding block and the inherited reference picture index pointing to a reference picture in the reference picture list of the current block. In order to avoid various issues due to potential misalignment, aligned motion parameter derivation is disclosed in the present invention. The aligned motion parameters may be used directly by the current block. In other words, the current block may inherit the motion parameters of the corresponding block. The corresponding block can be located by shifting a location of the current block by a derived disparity vector for the current block.

Various means to derive aligned motion parameters are disclosed. In one embodiment, the aligned motion parameters are derived by searching each current reference picture list of the current block to find a matched reference picture having a same POC (Picture Order Count) as that of the reference picture pointed by the MV of the corresponding block. The reference picture index of the matched reference picture is then used as the aligned reference picture index for the current block. If no matched reference picture having the same POC as that of the first reference picture in the reference view can be found in any current reference picture list, the aligned motion parameters are designated as unavailable or the aligned reference picture index is set to a default reference picture index, such as 0. In this case, the aligned MV for the aligned motion parameters is scaled from the MV of the corresponding block according to the POC of the corresponding reference picture of the corresponding block and the POC of a target reference picture in a current reference picture list pointed by the default reference index.

In another embodiment, the aligned motion parameters are derived by searching each current reference picture list to find a matched reference picture having a same view index as that of the reference picture pointed by the MV of the corresponding block. The reference picture index of the matched reference picture is then used as the aligned reference picture index for the current block. Furthermore, the aligned MV for the aligned motion parameters is scaled from the MV of the corresponding block according to view distance associated with the corresponding reference picture of the corresponding block and the matched reference picture having the same view index as that of the reference picture pointed by the MV of the corresponding block. If no matched reference picture having the same view index as that of the first reference picture in the reference view can be found in any current reference picture list, the aligned reference picture index is set to a default reference picture index. In this case, the aligned MV for the aligned motion parameters is scaled from the MV of the corresponding block according to view distance associated with the corresponding reference picture of the corresponding block and a target reference picture pointed by the default reference index.

In yet another embodiment, the aligned motion parameters are derived by searching each current reference picture list to check whether the reference picture index of the reference picture in the reference view to be inherited exceeds a maximum reference picture index of each current reference picture list of the current block. If the reference picture index of the reference picture in the reference view does not exceed the maximum reference picture index of each current reference picture list, the reference picture index for the current block is used as the aligned reference picture index. Otherwise, the aligned motion parameters are designated as unavailable or the aligned reference picture index is set to a default reference picture index. The default reference picture index can be set to a non-negative integer, N and information associated with N can be transmitted in a bitstream in a sequence, view, layer, picture, slice, CTU (coding tree unit), CU (coding unit) or PU (prediction unit) level. Information associated with N can also be implicitly derived. The default reference picture index can be set to the reference picture index of a target reference picture in the current reference picture lists having smallest POC (Picture Order Count) distance from the POC of the current picture. The aligned MV can be scaled according to the POC (Picture Order Count) of the corresponding reference picture of the corresponding block and the POC of a target reference picture in the current reference picture lists pointed by the default reference index.

DETAILED DESCRIPTION

As described above, motion information inheritance according to existing 3D-AVC practice may lead to misalignment between the inherited reference picture index and the inherited motion vector for the current block. Accordingly, embodiments according to the present invention incorporate derivation process to derive aligned motion parameters so as to avoid any potential misalignment between the inherited reference picture index and the inherited motion vector.

Accordingly, embodiments of the present invention check whether the motion parameters of a corresponding block is aligned with information associated with the reference picture list of the current block. If the motion parameters of a corresponding block do not match any reference picture in the reference picture list of the current block, the inter-view MV of the corresponding block in the base view (reference view) will be regarded as not available.

First Embodiment

According to this embodiment, the reference picture index is not directly reused by the current block. Instead, the POC of the reference picture in the base view (reference view) is searched within the reference picture lists of the current block to find a matched reference picture with the same POC. The reference picture index of the matched reference picture and the MV of the corresponding block are used for current block. When no matched reference picture can be found, the inter-view motion predictor is viewed as unavailable. The embodiment can be incorporated into the existing 3D-AVC practice by modifying related syntax and semantics.

Second Embodiment

The reference picture index is not directly reused by current block. Instead, the POC of the reference picture in the base view (reference view) is searched within the reference picture lists of the current block to find a matched reference picture with the same POC. The reference picture index and the MV of the matched reference picture are then used for the current block. When no matched reference picture could be found, the inherited reference picture index is set to a default reference index (e.g., 0), and the inherited MV is scaled according to the POC of the reference picture of the corresponding block and the POC of the reference picture pointed by the default reference index. Again, the embodiment can be incorporated into the existing 3D-AVC practice by modifying related syntax and semantics.

Third Embodiment

According to this embodiment, the reference picture index is not directly reused by current block when the inherited MV is an inter-view MV. Instead, the view index of the reference picture in the base view (reference view) is searched within the reference picture lists of the current block to find a matched reference picture with the same view index. The reference picture index of the matched reference picture is used for the current block. The inherited MV is scaled according to the view distance between the reference picture of the corresponding block and the reference picture pointed by the matched reference picture with the same view index.

When no matched reference picture can be found, the inherited reference picture index is set to a default reference index (e.g., 0). The inherited MV is scaled according to the view distance between the reference picture of the corresponding block and the reference picture pointed by the default reference index. The embodiment can also be incorporated into the existing 3D-AVC practice by modifying related syntax and semantics.

Fourth Embodiment

According to this embodiment, additional check is employed to check whether the inherited reference picture index exceeds the maximum reference picture index of the current block. When the inherited reference picture index exceeds the maximum reference picture index, the inter-view motion predictor is viewed as unavailable. The embodiment can also be incorporated into the existing 3D-AVC practice by modifying related syntax and semantics.

When the inherited reference picture index exceeds the maximum reference picture index of current block, the inherited reference picture index can be set to a default reference index N, where N is a non-negative integer. Information associated with N can be transmitted in the bitstream in the sequence, view, layer, picture, slice, CTU (coding tree unit), CU (coding unit) or PU (prediction unit) level. CTU, CU and PU are video coding/processing units as defined in the HEVC (High Efficiency Video Coding) standard. N can also be implicitly derived at a decoder side using the same derivation process as the encoder. The default reference index may be set to the reference picture with the smallest POC distance from the POC of the current coding picture. The inherited MV can be scaled according to the POC of the reference picture of the corresponding block and the POC of the reference picture pointed by the default reference index.

The performance of a 3D/multi-view video coding system incorporating the fourth embodiment of the present invention is compared with the performance of a conventional system based on ATM-9.0 as shown in Table 1. The performance comparison is based on different sets of test data listed in the first column. The BD-rate differences are shown for texture pictures in view 1 (video 1) and view 2 (video 2). As shown in Table 1, the BD-rate for texture pictures in view 1 and view 2 incorporating an embodiment of the present invention is the same as that of the ATM-9.0. The second group of performance is the bitrate measure for texture video only (video/video bitrate), the total bitrate (texture bitrate and depth bitrate) for texture video (video/total bitrate) and the total bitrate for coded and synthesized video (Coded & synth./total bitrate). As shown in Table 1, the average performance in this group is also the same as that of the conventional ATM-9.0. The processing times (encoding time, decoding time and rendering time) are also compared. As shown in Table 1, the encoding time, decoding time and rendering time is about the same. Accordingly, in the above example, the system incorporating the fourth embodiment achieves the same performance as the conventional ATM-9.0. However, when misalignment occurs between the inherited reference picture index and the inherited motion vector, the conventional system would result in system issues such as system crash due to memory fault related to the invalid reference picture index. On the other hand, the system incorporating the fourth embodiment will be free from such memory fault issue since the incorrect reference picture index will be avoided according to embodiments of the present invention.

TABLE 1

|  | Video 1 | Video 2 | video/Video bitrate | video/total bitrate | coded &synth/total bitrate | Enc time | Dec time | Ren time |
| --- | --- | --- | --- | --- | --- | --- | --- | --- |
| Balloons | 0.0% | 0.0% | 0.0% | 0.0% | 0.0% | 99.0% | 100.6% | 100.6% |
| Kendo | 0.0% | 0.0% | 0.0% | 0.0% | 0.0% | 100.0% | 99.6% | 100.7% |
| Newspaperce | 0.0% | 0.0% | 0.0% | 0.0% | 0.0% | 100.3% | 100.4% | 98.6% |
| GhostTownFly | 0.0% | 0.0% | 0.0% | 0.0% | 0.0% | 100.5% | 104.1% | 101.1% |
| PoznanHall2 | 0.0% | 0.0% | 0.0% | 0.0% | 0.0% | 100.2% | 100.3% | 102.2% |

TABLE 1-continued

|  | Video 1 | Video 2 | video/Video bitrate | video/total bitrate | coded &synth/total bitrate | Enc time | Dec time | Ren time |
|---|---|---|---|---|---|---|---|---|
| PoznanStreet | 0.0% | 0.0% | 0.0% | 0.0% | 0.0% | 99.9% | 103.7% | 99.8% |
| UndoDancer | 0.0% | 0.0% | 0.0% | 0.0% | 0.0% | 99.8% | 101.2% | 97.9% |
| 1024 × 768 | 0.0% | 0.0% | 0.0% | 0.0% | 0.0% | 99.8% | 100.2% | 100.0% |
| 1920 × 1088 | 0.0% | 0.0% | 0.0% | 0.0% | 0.0% | 100.1% | 102.3% | 100.3% |
| average | 0.0% | 0.0% | 0.0% | 0.0% | 0.0% | 99.8% | 101.4% | 100.1% |

Figure 7:
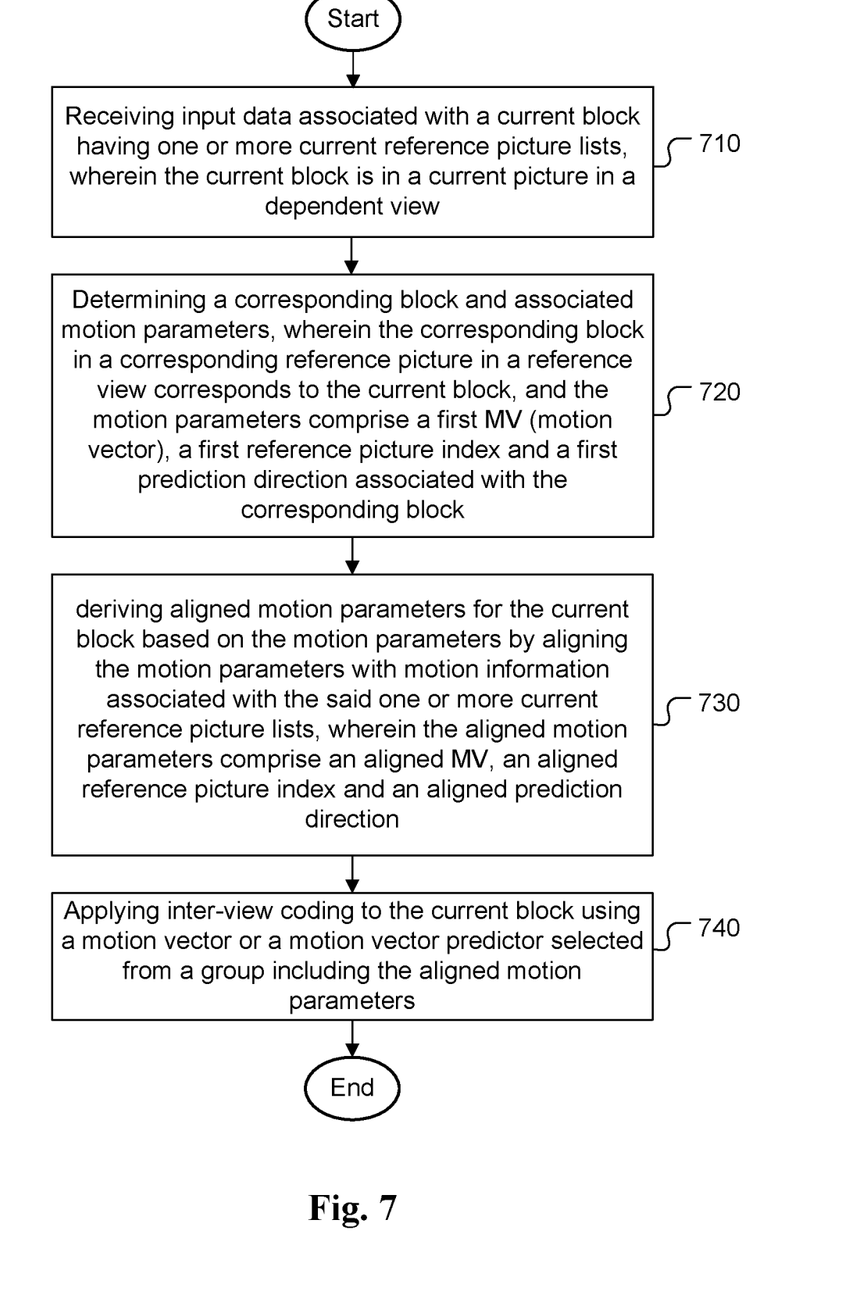
FIG. 7 illustrates an exemplary flowchart of deriving align motion parameters according to an embodiment of the present invention for 3D and multi-view video coding.

FIG. 7 illustrates an exemplary flowchart of a three-dimensional or multi-view video coding system incorporating aligned motion parameter derivation according to an embodiment of the present invention. The system receives input data associated with a current block having one or more current reference picture lists as shown in step 710, where the current block is in a current picture in a dependent view. For encoding, the input data associated with the current block corresponds to original pixel data, depth data, residual data or other information associated with the current block (e.g., motion vector, disparity vector, motion vector difference, or disparity vector difference) to be coded. For decoding, the input data corresponds to coded block to be decoded. The input data may be retrieved from storage such as a computer memory, buffer (RAM or DRAM) or other media. The input data may also be received from a processor such as a controller, a central processing unit, a digital signal processor or electronic circuits that produce the input data. A corresponding block and associated motion parameters are determined in step 720, where the corresponding block is in the corresponding reference picture in the reference view corresponding to the current block, and the motion parameters comprise a first MV (motion vector), a first reference picture index and a first prediction direction associated with the corresponding block. Aligned motion parameters for the current block are derived based on the motion parameters by aligning the motion parameters with motion information associated with the said one or more current reference picture lists as shown in step 730, where the aligned motion parameters comprise an aligned MV, an aligned reference picture index and an aligned prediction direction. Inter-view coding is applied to the current block using a motion vector or a motion vector predictor selected from a group including the aligned motion parameters as shown in step 740.

The flowchart shown above is intended to illustrate an example of deriving aligned motion parameter according to the present invention. A person skilled in the art may modify each step, re-arranges the steps, split a step, or combine steps to practice the present invention without departing from the spirit of the present invention.

The above description is presented to enable a person of ordinary skill in the art to practice the present invention as provided in the context of a particular application and its requirement. Various modifications to the described embodiments will be apparent to those with skill in the art, and the general principles defined herein may be applied to other embodiments. Therefore, the present invention is not intended to be limited to the particular embodiments shown and described, but is to be accorded the widest scope consistent with the principles and novel features herein disclosed. In the above detailed description, various specific details are illustrated in order to provide a thorough understanding of the present invention. Nevertheless, it will be understood by those skilled in the art that the present invention may be practiced.

Embodiment of the present invention as described above may be implemented in various hardware, software codes, or a combination of both. For example, an embodiment of the present invention can be a circuit integrated into a video compression chip or program code integrated into video compression software to perform the processing described herein. An embodiment of the present invention may also be program code to be executed on a Digital Signal Processor (DSP) to perform the processing described herein. The invention may also involve a number of functions to be performed by a computer processor, a digital signal processor, a microprocessor, or field programmable gate array (FPGA). These processors can be configured to perform particular tasks according to the invention, by executing machine-readable software code or firmware code that defines the particular methods embodied by the invention. The software code or firmware code may be developed in different programming languages and different formats or styles. The software code may also be compiled for different target platforms. However, different code formats, styles and languages of software codes and other means of configuring code to perform the tasks in accordance with the invention will not depart from the spirit and scope of the invention.

The invention may be embodied in other specific forms without departing from its spirit or essential characteristics. The described examples are to be considered in all respects only as illustrative and not restrictive. The scope of the invention is therefore, indicated by the appended claims rather than by the foregoing description. All changes which come within the meaning and range of equivalency of the claims are to be embraced within their scope.

The invention claimed is:

1. A method for three-dimensional or multi-view video coding, the method comprising:
  receiving input data associated with a current block having one or more current reference picture lists, wherein the current block is in a current picture in a dependent view;
  determining a corresponding block and associated motion parameters, wherein the corresponding block in a corresponding reference picture in a reference view corresponds to the current block, and the motion parameters are associated with the corresponding block and comprise a first MV (motion vector) pointing to a first reference picture, a first reference picture index of the first reference picture and a first prediction direction of the corresponding block;
  based on a determination of whether the motion parameters of the corresponding block are aligned with information associated with a reference picture list of the current block, deriving aligned motion parameters for the current block based on the motion parameters by aligning the motion parameters with motion information associated with said one or more current reference picture lists, wherein the aligned motion parameters comprise an aligned MV, an aligned reference picture index and an aligned prediction direction; and applying inter-view coding to the current block using a motion vector or a motion vector predictor selected from a group including the aligned motion parameters.

2. The method of claim 1, wherein the coded motion information corresponds to Inter prediction direction associated with the target Merge candidate, reference frame index associated with the target Merge candidate, one or more second motion vectors associated with the target Merge candidate, one or more motion vector differences between one or more current motion vectors of the current block and said one or more second motion vectors, or any combination thereof.

3. The method of claim 2, wherein said one or more motion vector differences are coded by excluding zero-valued motion vector difference from said one or more motion vector differences.

4. The method of claim 2, wherein the coded motion information corresponds to said one or more motion vector differences between said one or more current motion vectors and said one or more second motion vectors.

5. The method of claim 4, wherein, when the current block coded is coded in a uni-prediction mode, said one or more motion vector differences correspond to a single motion vector difference and the single motion vector difference is used to refine one second motion vector in a corresponding reference picture list.

6. The method of claim 4, wherein, when the current block coded is coded in a bi-prediction mode and said one or more motion vector differences correspond to a single motion vector difference, the single motion vector difference is used to refine one second motion vector in a pre-defined list.

7. The method of claim 1, further comprising inheriting a remaining part of the current motion information from second motion information associated with the target Merge candidate, and the decoded current motion information consists of the first part of the current motion information and the remaining part of the current motion information.

8. The method of claim 7, wherein the remaining part of the current motion information inherited from the second motion information associated with the target Merge candidate corresponds to Inter prediction direction, reference frame index, a second motion vector, or any combination thereof.

9. The method of claim 8, wherein the remaining part of the current motion information inherited from the second motion information associated with the target Merge candidate corresponds to Inter prediction direction, reference frame index and a second motion vector.

10. A method for motion information coding using coding modes including Merge mode, the method comprising:

receiving current motion information of a current block;

determining second motion information associated with one or more neighboring blocks of the current block;

deriving a Merge candidate set consisting of one or more Merge candidates based on the second motion information associated with said one or more neighboring blocks;

selecting a target Merge candidate from the Merge candidate set;

signaling a Merge index corresponding to the target Merge candidate;

predicting a first part of the current motion information based on partial second motion information associated with the target Merge candidate to generate coded motion information; and signaling the coded motion information for the current motion information without other coded information corresponding to remaining part of the current motion information.

11. The method of claim 10, wherein the coded motion information corresponds to Inter prediction direction associated with the target Merge candidate, reference frame index associated with the target Merge candidate, one or more second motion vectors associated with the target Merge candidate, one or more motion vector differences between one or more current motion vectors of the current block and said one or more second motion vectors, or any combination thereof.

12. The method of claim 11, wherein said one or more motion vector differences are coded by excluding zero-valued motion vector difference from said one or more motion vector differences.

13. The method of claim 11, wherein the coded motion information corresponds to said one or more motion vector differences between said one or more current motion vectors and said one or more second motion vectors.

14. The method of claim 13, wherein, when the current block coded is coded in a uni-prediction mode, said one or more motion vector differences correspond to a single motion vector difference and the single motion vector difference is used to refine one second motion vector in a corresponding reference picture list.

15. The method of claim 13, wherein, when the current block coded is coded in a bi-prediction mode and said one or more motion vector differences correspond to a single motion vector difference, the single motion vector difference is used to refine one second motion vector in a pre-defined list.

16. The method of claim 10, wherein the remaining part of the current motion information inherited from the second motion information associated with the target Merge candidate corresponds to Inter prediction direction, reference frame index, a second motion vector, or any combination thereof.

17. The method of claim 16, wherein the remaining part of the current motion information inherited from the second motion information associated with the target Merge candidate corresponds to Inter prediction direction, reference frame index and a second motion vector.

18. A method for motion information decoding, the method comprising:

receiving a bitstream including coded data for a current block and one or more neighboring blocks of the current block;

determining second motion information associated with said one or more neighboring blocks of the current block; and providing decoded current motion information of the current block by determining a first part of current motion information based on coded motion information signaled in the bitstream and a remaining part of the current motion information inherited from the second motion information, wherein the coded motion information is generated based on partial second motion information associated with one of said one or more neighboring blocks.

19. A method for motion information coding, the method comprising:

receiving current motion information of a current block;

determining second motion information associated with one or more neighboring blocks of the current block;

determining a first part of the current motion information based on partial second motion information associated with one of said one or more neighboring blocks to generate coded motion information; and signaling the coded motion information for the current motion information without other coded information corresponding to remaining part of the current motion information.

20. The method of claim 15, wherein the aligned MV is scaled according to a POC (Picture Order Count) of the corresponding reference picture of the corresponding block and the POC of a target reference picture in the current reference picture lists pointed by the default reference index.

* * * * *